United States Patent [19]
Brandenburg

[11] 3,770,005
[45] Nov. 6, 1973

[54] SHUT-OFF DEVICE, IN PARTICULAR, A HOT BLAST SLIDE VALVE

[75] Inventor: Jan Hendrik Brandenburg, Heemstede, Netherlands

[73] Assignee: Zimmermann & Jansen Gesellschaft mit beschrankter Haftung, Duren, Germany

[22] Filed: Mar. 10, 1972

[21] Appl. No.: 233,493

[52] U.S. Cl. ............................... 137/340, 251/367
[51] Int. Cl. ............................................. F16k 49/00
[58] Field of Search ............... 137/340, 334, 454.2, 137/5, 6; 251/367, 328, 329

[56] References Cited
UNITED STATES PATENTS

| | | | |
|---|---|---|---|
| 3,136,330 | 6/1964 | Dawling | 137/340 |
| 3,197,175 | 7/1965 | Siepmann | 251/329 X |
| 3,266,517 | 8/1966 | Carr | 137/340 |
| 3,442,490 | 5/1967 | Smith | 251/367 X |
| 3,499,462 | 3/1970 | Berczynski | 137/340 |
| 3,610,574 | 10/1970 | Hartmann | 251/328 X |
| 3,616,812 | 11/1971 | Vietorisz | 137/340 |

*Primary Examiner*—Samuel Scott
*Attorney*—Eric H. Waters et al.

[57] ABSTRACT

Summarizing, the present invention provides a shut-off device, in particular for superheated gases or a hot blast slide valve with a large diameter bore closable by a slide valve gate guided in a slot of the valve casing, the valve casing having at each axial end thereof a connection flange, the connection flanges being disposed relative to each other at an angle of one to a few degrees.

8 Claims, 2 Drawing Figures

PATENTED NOV 6 1973  3,770,005
Fig.1
Fig.2
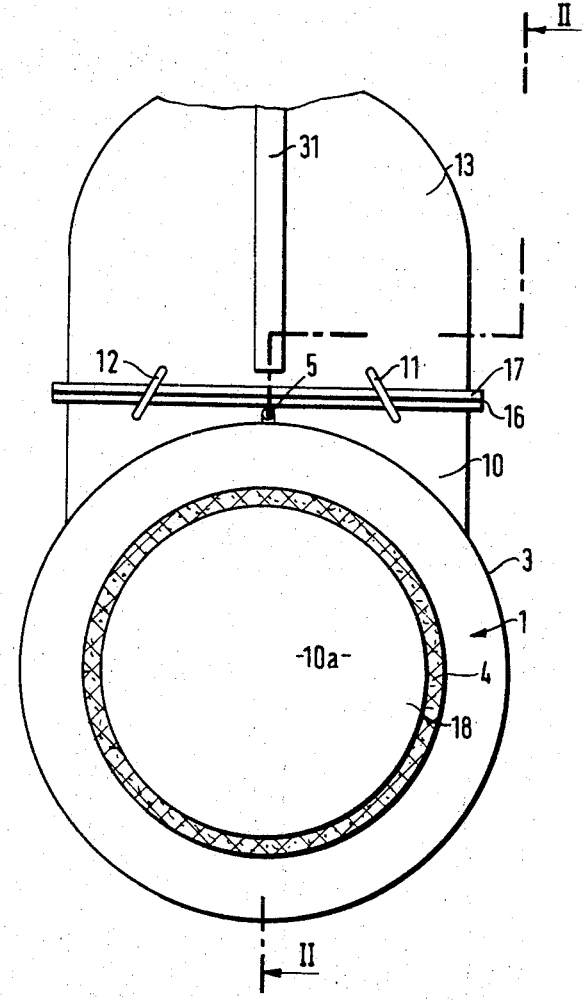
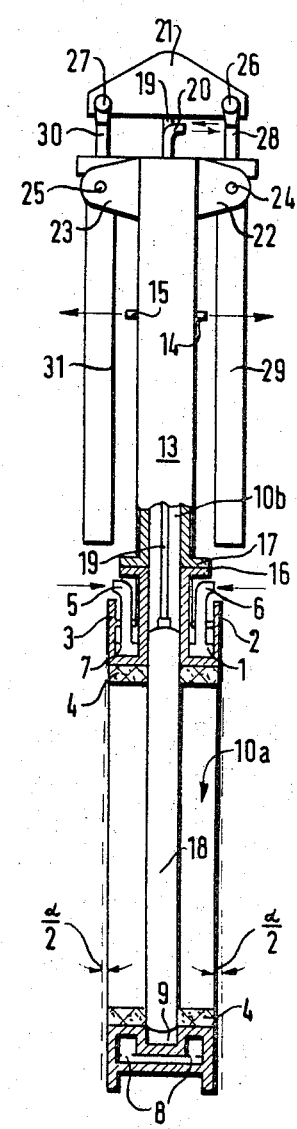

SHUT-OFF DEVICE, IN PARTICULAR, A HOT BLAST SLIDE VALVE

This invention relates to a shut-off device, in particular for superheated gases or a hot blast slide valve having a large diameter, with a slide valve gate guided in a slot of the casing of a slide valve chamber and with a connection flange at each axial end of the casing.

In shut-off slide valves whose pipe diameters have increased continuously in the course of technical development for example to a diameter of 2,000 to 2,500 mm, difficulties occur in dismantling, i.e. removing the valve as a block from the pipe ends attached to it, and reassembly for maintenance and repair, if the shut-off slide valves, are subjected in operation to high temperatures loads or other, partially corrosive loads. These difficulties in the dismantling and reassembly of the shut-off slide valves, which operations are necessary in some cases at long intervals and in some cases very often, may well occur to some extent, on the relatively large contact faces between the connection flanges of the shut-off slide valve and the connection flanges, associated therewith, of the ends of the pipes opening into the shut-off slide valve. These difficulties are caused by the fact that with increasing size of the contact surfaces between the connection flanges, a relatively large force must be used in order to overcome not only high frictional resistance but also adherence forces which occur between the connection flanges, particularly inner edges of the contact surfaces between the connection flanges as a result of adhesion, incrustation, sintering or the like. These and other difficulties appreciably impair the handling of such shut-off slide valves, adversely affect the times required for dismantling and reassembling, whereby the high production process plants connected to the associated pipes having to remain inoperative.

With shut-off slide valves for pipes in which media are transported having high and to some extent very variable temperatures, and which are therefore provided on their inside surfaces with a fluid-cooled casing and also have a fireproof brick lining or mantle, (e.g., hot gas slide valves, hot-blast slide valves or flue-gas slide valves) the difficulty is that the fireproof brick lining of the pipe ends and the abutting fireproof brick lining of the shut-off slide valve, are sintered together on the front side in the vicinity of the connection flanges. When the shut-off slide valve is dismantled, this brick lining often comes out in more or less sizeable pieces, since in pipes of large diameter, the strength of the fireproof brick lining is not sufficient due to the adverse ratio between the thickness of the fireproof brick lining and the diameter of the pipe. Moreover, deformations may occur in the other parts of the slide valves, which deformations hinder dismantling. Such difficulties occur particularly in hot blast slide valves of blast furnace plants, which are loaded with hot air having a temperature of roughly 1,400°C which changes periodically.

The above-described and other advantages may occur in the described shut-off slide valves, if the pipes, in the form of temperature compensators, formed by wave-like sections of the pipe, subjected to high temperature, are mechanically slightly pressed together at the time of dismantling and assembly. This pressing together involves, on the one hand, loading of the compensators which is undesired on a large scale and requires extra expenditure of energy. On the other hand, a purely axial stress is exerted on the faces between the shut-off slide valve and the pipe ends, which may increase the above described disadvantages.

Instead of dismantling or removing the entire shut-off slide valve from the pipe ends attached to it, it is also known, to dismantle the slide valve gate from the casing of the shut-off slide valve and to leave the casing firmly attached to the pipe ends. In this way, the sealing seats are repaired or completely resealed at the slide valve gate and inside the casing when the shut-off slide valve is in the dismantled condition. However, with this method, the stoppage time of the connected process plants is even more prolonged. This is also true, if the casing of the shut-off slide valve as described in German Pat. specification No. 748,465, is assembled from three wedge-shaped individual parts, which can be inserted in each other and the dismantling of which is even more complicated by the dismantling, assembly and sealing of the cooling system. Above all, with pipes of large diameter it is no longer possible to reach the sealing seats remaining in the casing. However, it is particularly important in shut-off slide valves that sealing is guaranteed at excess pressure of several atmospheres. It is however also undesirable to increase the assembled length of the shut-off slide valve, since a compact assembled size is particularly necessary for a slide valve construction and in particular in the case of large diameters, the weight of the construction would be increased considerably.

An only partially wedge-shaped construction of the connection between the casing of a throttle valve shut-off device and the pipe ends, would not solve the problem described for the shut-off slide valve.

An object of the invention is to provide a shut-off device, preferably a shut-off slide valve, of the kind described which is subjected to high temperatures and in which the above and other disadvantages are avoided.

It is also an object of the invention to improve the construction of the fluid cooling of such shut-off slide valves.

Surprisingly it has been established according to the invention that these difficulties are completely overcome if the connection flanges are disposed relative to each other at an angle of one to several degrees.

This angle between the connection flanges can be approximately 5° but is preferably between 1° and 2°30' and in a preferred embodiment between 1°30' and 1°45'. Evidently the ends of the pipe at which the valve is attached by its flanges preferably have a complementary angle such that the longitudinal axis of the pipe keeps straight.

Preferably, the two planes of the respective end-sided outer faces of the connection flanges are symmetrical relative to the plane in which the axis of the slide valve is located and which is vertical to the longitudinal axis of the shut-off device.

Also, the shut-off slide valve according to the invention is formed most advantageously in such a manner that the shortest axial dimension between the outer faces of the two connection flanges is at least 2½ times as large as the thickness of the slide valve. Such a dimensional proportion is adequate for obtaining a sufficiently strong construction of the casing despite the reduction in the axial dimension of the shut-off slide valve, occurring due to the angular position of the connection flanges.

Another preferred embodiment is a shut-off slide valve device, in which the slide valve casing is cooled with fluid in known manner and which has a fireproof lining extending to the slide valve gate, the cooled slide valve chamber having its largest axial dimension in the region of the slot.

If the shut-off device according to the invention is mounted between two pipe ends, the mounting flanges of which ends incline towards each at the same complementary angle as the mounting flanges of the shut-off slide valve then the entire shut-off slide valve casing, also in the case of pipes of large diameter, may be dismantled and reassembled in very easily, quickly and safely, whereby apparently a combination of axial and shearing forces occurring at these angles affords the advantages, whithout the angles needing to be increased, due to which the disadvantage of an increased assembled length is avoided. Of course, in particular cases, the pipe ends to be connected to the shut-off device may be orientated to the casing of the shut-off device, at an angle corresponding to the angle between the connection flanges of the shut-off slide valve. When the temperature compensators are installed their construction may be provided with the angular formation according to the invention by modifying the construction of their fireproof mantle, since the compensators do not need to be pressed together or have to be pressed together only very slightly when the slide valve device is dismantled.

The angular setting according to the invention, between the connection flanges of the shut-off slide valve can also be used in a particularly preferred combination for improving the uniformity of the fluid cooling of the casing, in that the cooling fluid cross section, in the region adjacent the slot can be made larger than, or as large as on the diametrically opposed side of the slide valve. A very exact construction of the fluid cooling of the casing is, however, of very great importance in order to prevent deformations due to thermal stresses.

The invention will now be further described by way of example only, with reference to the accompanying drawings, in which:

FIG. 1 is a diagrammatic fragmentary view of one embodiment of shut-off slide valve according to the invention in the dismantled condition as seen in the direction of the longitudinal axis of the pipe, and FIG. 2 is a partly cross sectional view along the line II—II of FIG. 1.

The shut-off slide valve according to FIGS. 1 and 2 has a slide valve casing 10, which has, at its axial ends, connection flanges 2 and 3, by which the slide valve casing 10 is secured to respective connection flanges of two pipe ends (not shown) extending to the slide valve casing by means of bolts or similar means. A slide valve chamber 1 is located between the connection flanges 2 and 3.

Inside the slide valve casing 10, a fireproof brick lining 4 is applied to the inner surface of the flow-through section 10a, which lining passes from the outer side of each connection flange 2,3 up to the slide valve gate 18. The slide valve gate 18 is guided in a recess 9 on the inner edge of the periphery of the casing, in such a manner that it can be withdrawn from the flow-through section 10a through a slot 10b, perpendicular to the longitudinal axis of the pipe, by means of a rod 19.

The rod 19 can be drawn, with the slide valve gate 18, into a casing attachment 13, for opening and closing the flow-through section 10a. The casing attachment 13 is connected to the slide valve casing 10 by means of flanges 16 and 17 and has pressure cylinders 29 and 31 secured to pivots 24 and 25 in holders 22 and 23, the piston rods 28 and 30 of which cylinders are connected to the outer end of the rod 19 at pivots 26 and 27 of a yoke member 21, in order to be able to move the rod forwards and backwards inside the slot 10b to open and close the slide valve within a short time.

The slide valve chamber 1 contains sealed cooling fluid ducts, in which the cooling water circulates on an annular path after delivery to the slide valve casing 10 through supply conduits 5 and 6 whereupon it flows through an inner cooling fluid duct, formed by an intermediate wall 7, along the wall directed radially inwards towards the flow-through cross-section, to the opposite side of the slide valve chamber. There the cooling water is diverted, through apertures 8 in the intermediate wall 7, to an outer cooling fluid duct, in which it flows back, in a circular manner, to the slot 10b and from there flows into the casing attachment 13 through conduits 11 and 12 (cf. FIG. 1), from which attachment the cooling fluid is then removed through apertures 14 and 15.

The slide valve gate 18 can also be cooled with fluid passing through conduits 20 and the hollow rod 19 or through isolated conduits to the slide valve gate 18, so that the cooling fluid inside the slide valve gate 18 circulates over the entire surface of the latter. If the conduits 20 are arranged adjacent the rod 19, up to their connection with the slide valve gate, they can be moved up and down together with this rod and the yoke member 21.

As is shown in FIG. 2 in dotted line, the outer faces of the connection flanges 2,3 are disposed relative to each other, at a slight angle of $\alpha$ (i.e., $2 \times (\alpha/2)$) in order to facilitate the assembly and above all the dismantling of the shut-off slide valve at its connection flanges 2 and 3. Surprisingly, an angle of one to several degrees, i.e. up to approximately 5° has proved to be the optimum angle. This angle between the two outer faces of the connection flanges 2 and 3 is preferably about 1° to 2°30′ advantageously from 1°30′ to 1°45′. Accordingly the flanged ends of the pipe attached to the flanges 2,3 of the valve preferably have a complementary angle such that the longitudinal axis of the pipe line is kept straight.

This angle $\alpha$ may also be provided on only one of the two connection flanges 2,3 while the outer face of the other flange is perpendicular to the longitudinal axis of the shut-off slide valve. On the other hand, the symmetrical shape has, of course, the important advantage that the cross-section of the cooling fluid ducts can be of equal size on both sides of the slide valve gate 18 and deformations due to thermal stresses are avoided. Thus it is also of additional advantage, if the connection flanges 2 and 3 diverge at the angle $\alpha$ towards the slot 10b, since this provides additional space for the cross-section of the cooling fluid ducts on both sides of the casing area narrowed down by the slot 10b, so that the cooling may be more uniform in the case of an optimum short axial dimension of the shut-off slide valve. Moreover, the dismantling of the shut-off slide valve may then take place in the direction of the casing attachment 13, due to which the smallest possible space is required and also the temperature compensators, which may possibly be present, need to be only very slightly pressed together.

A constructional example of the shut-off slide valve has the axial extent of the slide valve chamber, between the connection flanges 2 and 3 formed with an internal diameter of 2,000 mm, (external diameter of the connection flanges 3,300 mm), and is 800 mm long on the side of the slot 10b and 720 mm long on the diametrically opposite side.

It is also apparent from this, that a generally wedge-shaped formation of the cooling fluid ducts, in accordance with the above mentioned angles $\alpha$, may be taken advantage of to improve uniformity of cooling, as the angle formation $\alpha$ is used for controlling the speed of the cooling medium.

If the connection flanges diverge downwardly below the angle $\alpha$, at the time of dismantling, the shut-off slide valve can firstly be moved down somewhat due to its force of gravity and then be removed laterally between the pipe ends. In a similar manner, the angle $\alpha$ may also be formed, for example, diverging laterally with respect to the longitudinal axis of the pipe. What I claim is:

1. A slide valve comprising a casing in-cluding at least one annular sealing face for cooperation with at least one sealing face of a slide valve body, said sealing face on the slide valve body being arranged in parallel relationship with the opposite sides of the slide valve body, means for operating the slide valve body between a valve-open and valve-closed position, the slide valve casing having at each axial end thereof a connection flange adapted to be con-nected to mating flanges, at least the outwardly facing surfaces of said connection flanges which are adapted to contact the mating flanges being disposed relative to each other at an incline defining an angle of one to a few degrees.

2. Valve according to claim 1 wherein the connection flanges are disposed relative to each other at an angle of 1° to 2°45'.

3. Valve according to claim 1 wherein the connection flanges are disposed relative to each other at an angle of 1°30' to 1°45'.

4. Valve according to claim 1 wherein the two planes containing the outer faces of the connection flanges are symmetrical with respect to an axial plane of the slide valve transverse the valve bore.

5. Valve according to claim 1 wherein the shortest axial dimension between the outer faces of the two connection flanges is at least 2½ times as large as the thickness of the slide gate.

6. A valve according to claim 1 wherein said connection flanges are disposed relative to each other at an angle of 1° to 5°.

7. Valve according to claim 1 wherein the slide valve casing is cooled with fluid in a known manner and has a refractory lining extending to the slide valve gate, the cooled slide valve chamber having its largest axial dimension in the region of the slot in the valve casing.

8. Valve according to claim 7, wherein the cooling fluid cross-section in the region adjacent the slot is larger than or as large as on the diametrically opposite side of the slide valve.

* * * * *

UNITED STATES PATENT OFFICE
CERTIFICATE OF CORRECTION

Patent No. 3,770,005                        Dated   November 6, 1973

Inventor(s)  Jan Hendrik Brandenburg

It is certified that error appears in the above-identified patent and that said Letters Patent are hereby corrected as shown below:

On the cover sheet insert

-- [30] Foreign Application Priority Data

Germany          P21114976          March 10, 1971  --.

Signed and sealed this 17th day of September 1974.

(SEAL)
Attest:

McCOY M. GIBSON JR.                  C. MARSHALL DANN
Attesting Officer                    Commissioner of Patents